United States Patent [19]

Toda et al.

[11] Patent Number: 5,442,761
[45] Date of Patent: Aug. 15, 1995

[54] METHOD BY WHICH PACKET HANDLER INSERTS DATA LOAD INSTRUCTIONS IN INSTRUCTION SEQUENCE FETCHED BY INSTRUCTION FETCH UNIT

[75] Inventors: Kenji Toda; Yoshinobu Uchibori; Toshio Shimada, all of Tsukuba, Japan

[73] Assignee: Agency of Industrial Science & Technology, Ministry of International Trade & Industry, Tokyo, Japan

[21] Appl. No.: 173,478

[22] Filed: Dec. 27, 1993

Related U.S. Application Data

[63] Continuation of Ser. No. 498,276, Mar. 23, 1990, abandoned.

[30] Foreign Application Priority Data

Apr. 20, 1989 [JP] Japan ................................. 1-101425

[51] Int. Cl.⁶ ............................................. G06F 9/312
[52] U.S. Cl. ................................... 395/375; 395/700; 395/821; 364/284.3; 364/DIG. 1
[58] Field of Search ............... 395/375, 800, 200, 275, 395/725; 320/94.1, 94.2, 94.3

[56] References Cited

U.S. PATENT DOCUMENTS

| | | | |
|---|---|---|---|
| 4,709,324 | 11/1987 | Kloker | 395/725 |
| 4,814,978 | 3/1989 | Dennis | 364/200 |
| 4,901,274 | 2/1990 | Maejima et al. | 395/275 |
| 4,916,652 | 4/1990 | Schwarz et al. | 395/650 |
| 5,010,477 | 4/1991 | Omoda et al. | 395/800 |
| 5,212,778 | 5/1993 | Dally et al. | 395/400 |

*Primary Examiner*—William M. Treat
*Attorney, Agent, or Firm*—Oblon, Spivak, McClelland, Maier, & Neustadt

[57] ABSTRACT

In a computer system, when data for a register assigned to a current process arrives at a processing element, an instruction for loading this data is automatically inserted into an instruction sequence to be fetched by an instruction fetch unit provided in the processing element, thus synchronizing of data on registers is enabled. In addition, when data for a register assigned to a process which had previously been suspended and is not the current process arrives at the processing element, the data is written to a corresponding save area allotted in local memory for that register. Suspension of a process occurs at a point in time at which a register assigned to that process is accessed by an instruction but no data is yet present in the register and when this process suspension occurs, the process to be executed is switched to another process. When a register to which data arrives was the cause of a process suspension, that process which had been suspended is re-registered as an executable process and furthermore the data which arrived in the save area will be unsaved to the corresponding register.

4 Claims, 4 Drawing Sheets

METHOD BY WHICH PACKET HANDLER INSERTS DATA LOAD INSTRUCTIONS IN INSTRUCTION SEQUENCE FETCHED BY INSTRUCTION FETCH UNIT

This application is a Continuation of application Ser. No. 07/498,276, filed on Mar. 23, 1990, now abandoned.

BACKGROUND OF THE INVENTION

1. Field of the Invention

This invention relates to a method of inserting a data load into an instruction sequence on a computer system, and particularly to such a method which is also suitable for use in processing elements which comprise systems based on reduced instruction set computer (RISC) architecture.

2. Description of the Related Art

Data synchronization methods suitable for non-RISC computer systems, as known in the prior art, include methods which allow synchronizing of data to be done in memory; namely, those in which each memory element is provided with a flag which indicates the status of that data so that data access requests are held until certain conditions of the flags are met. The benefits of such methods include that the synchronizing of data among processes is fast since processing is based on individual pieces of data and can be accomplished with simple code.

However, such methods of synchronizing of data on memory are difficult to apply to processing elements, such as those in the above RISC systems, which employ architecture based on register operations which have recently attracted much attention. To begin with, in such register operation-based architecture, since the registers are tightly bound to the processing elements, there are problems with arbitration with respect to the execution unit as well as difficulties with the access path, so external access to registers is hard to implement. Furthermore, registers are an expensive resource and their capacity is limited for achieving a wide data transmission band-width and fast access so when a register has to wait for data for long periods, use of a memory element for the register is unavoidable, but an answer to the problem of just how the synchronizing of data at this time is to be accomplished has yet to be reported.

OBJECT AND SUMMARY OF THE INVENTION

The present invention came about in light of the above, and its object is to preferably provide a data load instruction insertion method which is suitable for data synchronization on registers and applicable to register operation-based computer systems such as RISC-type computer systems, in which not only is the synchronizing of data for the process currently being executed (the "current process") carried out in registers, but also the synchronizing of data among a plurality of processes is also carried out in the registers in a natural and efficient manner.

In order to achieve the above object, the invention, in its most basic aspect, comprises a method in which, when a data send request or the like is issued by the processing element and data is sent in response from external memory or the like to a register assigned to the current process, upon arrival of the data to the processing element, a load instruction for the data is automatically generated and inserted into the instruction sequence to be fetched by the instruction fetch unit of the processing element.

In addition to this basic composition, a further aspect of the invention is disclosed in which, when data has arrived at not the register assigned to the current process, but at a register specified in a save area within local memory, namely a register assigned to a process the execution of which had previously been suspended prior to its completion, the data which has arrived is loaded into the save area corresponding to that register.

In this manner, the synchronizing of data may be carried out rationally in the appropriate register for not only registers belonging to the current process but also for registers belonging to processes which have been suspended.

In addition, with respect to how a process suspension as described above is effected for a process which had been started in the past, or in other words, under what conditions the current process is suspended, as a technique for smoothly and rationally combining this with the above basic composition, the following technique is hereby disclosed.

Namely, suspension of a process occurs if that process is the current process when the register assigned to that process is accessed by an instruction but no data has yet been loaded into the register; at which time, the current process is suspended and the process to be executed is switched to another process.

Furthermore, with respect to a technique for resuming the execution of a process which has been suspended in such manner, as a rational technique which may coexist with the above composition and assure a smooth relationship, the following technique is hereby disclosed.

For each register assigned to a process not currently being executed as a result of its being previously subjected to a process suspension as described above, a save area corresponding to that register is specified in local memory as described in the composition of the second aspect of the invention described above, so when data arrives in this save area and this register is the register which was the cause of the process suspension, that process is re-registered as an executable process.

Naturally, the data contained in the save area will be unsaved to the corresponding register at least before the execution of the process re-registered in this manner is resumed (and preferably at the timing of the resumption of the process).

Note that if the basic composition or the first aspect of the invention is followed, the data load instruction inserted into the program for the register assigned to the current process does not need a value immediately, but rather the provision of a value may be delayed until the register is actually used when accessed by an instruction. Thus, if the data arrives at the register before it is actually used, the load instruction for the data which has arrived is automatically inserted into the instruction sequence to be fetched by the instruction fetch unit of the processing element, so even in the case when the instruction sequence is executed by multistage pipeline processing, the instruction which loads data into the register may be executed without side effects at any stage. In other words, the load instructions generated by this invention may be treated just as the execution of normal instructions so synchronizing of data on registers is possible without causing a pipeline break.

On the other hand, when also following the third aspect of the invention, if the data which has arrived is for a register assigned not to the current process but to a process which has been suspended, a save area corresponding to that register is specified in local memory so the data which has arrived can be loaded into this area.

Furthermore, in addition to this basic data synchronizing action on the register side, following the third aspect of the invention, suspension of a process being executed occurs if that process is the current process when the register assigned to that process is accessed by an instruction but no data has yet been loaded into the register; consequently, by switching the process to be executed to another process, a plurality of processes may be executed totally in a rational manner with virtually no loss of time.

In addition, according to the fourth aspect of the invention, when data arrives in a save area specified in local memory such that it corresponds to a register assigned to a process not currently being executed as a result of its being previously subjected to a process suspension as described above, and this register is the register which was the cause of the process suspension, that process is re-registered as an executable process, and furthermore the data contained in the save area will be unsaved to the corresponding register at least before the execution of the process re-registered in this manner is resumed, so the process can be automatically made executable again without requiring any special processing. In summation, according to this fourth aspect of the invention, coupled with the composition of the first, second and third aspects of the invention, a practical computer system based on RISC-type architecture may be built such that extremely high execution efficiency is achieved. With respect to programming style, this method allows code to be written naturally in the present style in which data is loaded into registers and then used.

The above and other features and objects of the invention will become apparent with the following detailed description made with reference to the appended drawings.

DETAILED DESCRIPTION OF THE PREFERRED EMBODIMENTS

Figure 1:
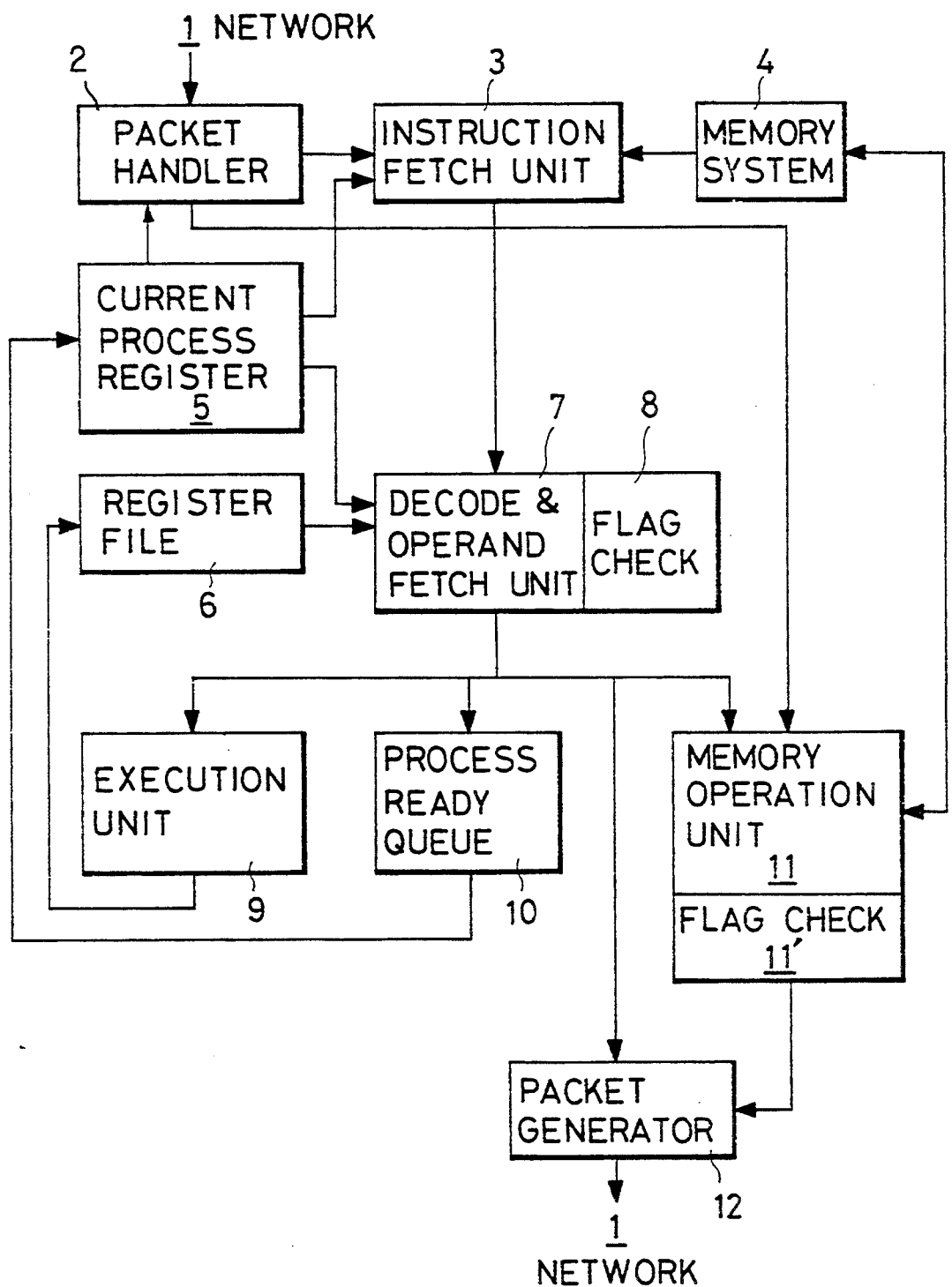
FIG. 1 is a schematic diagram of the configuration of one preferred embodiment of a unit or fundamental processing element suited for the application of the method of the invention.

FIG. 1 illustrates a fundamental or unit processing element by which the method of the invention is realized.

In this preferred embodiment, the unitary processing element is assumed to be based on reduced instruction set computer (RISC) architecture and carries out multistage pipeline processing, e.g., four-stage pipeline processing comprising the steps of:

① Instruction fetch (IF),
② Decode & operand fetch (D),
③ Execution (E),
④ Write (W), and executes one process at a time. Naturally, in a general purpose parallel computer to be used as a practical product, a plurality of processing elements would be interconnected by means of the network as shown in FIG. 1.

Therefore, first of all, the following description will begin with respect to such a unit processing element, including a brief description of the various functions, based on as static of configuration as possible.

Functional blocks 3, 4, 7 and 9 are portions related to the basic functions of a RISC-type computer, while functional blocks 5, 6, 10 and 11 are functions which support multiple processes and functional blocks 2, 8 and 12 are concerned with functions which communicate with other unit processing elements.

Here follows a description of each individual block. The packet handler 2 carries out dispatching of packets (data to which an address is added) which are sent from external sources through a network 1. Upon the arrival of every packet, the packet handler 2 accesses the current process register 5; if the packet is to be put into the register assigned to the current process, a data load instruction is generated and automatically inserted into the instruction sequence to be fetched by the instruction fetch unit 3.

If the delivered packet is not for the register assigned to the current process, as will become apparent in a subsequent description, a save area corresponding to that register is specified in local memory 22 (FIG. 4) within the memory system 4 so the data carried in the packet can be loaded into this corresponding save area in the memory system 4.

The instruction fetch unit 3 normally functions to fetch instructions from the memory system 4 from the address indicated by a program counter indicated by the current process register 5. Correspondingly, the memory system 4 naturally stores a program and data.

The current process register 5 provides the criteria upon which the packet handler 2 decides whether or not a packet sent through the network 1 should be assigned to the current process or not; of course, this register also has functions for indicating the current process (including the program counter and register file indicators, and the like) as are normally present in this type of process register.

The register file 6 is a set of many registers among which, the group of registers specified in the current process register 5 may be read by the decode & operand fetch unit 7 or written to by the execution unit 9.

The decode & operand fetch unit 7 decodes instructions sent from the instruction fetch unit 3 and fetches operand data from the register file 6. Furthermore, the decode & operand fetch unit 7 dispatches the decoded instruction to their various destinations: normal instructions are sent to the execution unit 9; process generation instructions to the process ready queue 10; memory access instructions to the memory operation unit 11; and external memory access instructions are sent to the packet generator 12; thereby each functional block 9, 10, 11 and 12 selectively receives its own instructions.

The flag check unit 8 is attached to the decode & operand fetch unit 7; this flag check unit 8 checks the flag of the appropriate register when the decode & operand fetch unit 7 fetches data from the register file 6. For normal instructions, if data is present in the register, the data is sent to the execution unit 9, otherwise the current process is suspended.

When a process which had been the current process is suspended, a new process is fetched from the process ready queue 10, which indicates other executable processes which are in the suspended state, and sent to the current process register 5. The execution unit 9 carries out a specified operation on the data provided by the decode and operand fetch unit and writes the result to a specified register within the register file 6.

The process ready queue 10 is as described above; the memory operation unit 11 reads and writes data to and from the memory system 4 according to memory operation requests. Note that a flag check unit 11' is attached to the memory operation unit 11 to check flags at this time so that any attempted access to data which does not exist will be automatically forced to wait until data is loaded. With respect to requests for transmitting data to external destinations, data is supplied to the packet generator 12. In response, the packet generator 12 will generate a packet of the specified format and send it over the network 1.

The above describes the data synchronization method of the invention albeit in a static manner, so now a preferred embodiment of the invention will be described in a more concrete manner with a working example, by introducing a simple model.

Figure 2:
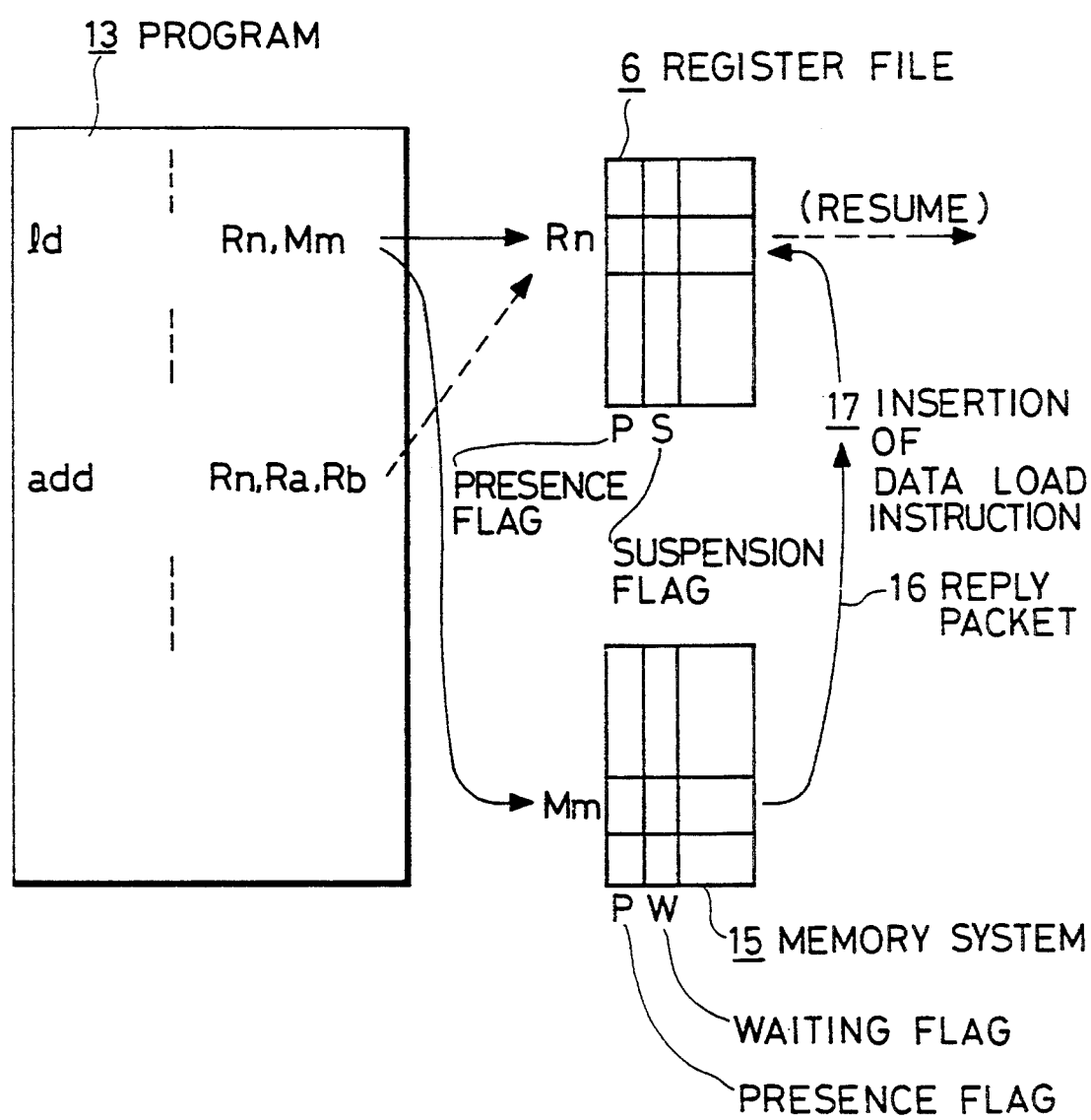
FIG. 2 is a diagram used to describe the operation of one preferred embodiment of the method of the invention.

FIG. 2 illustrates a program 13 which contains an instruction ld Rn,Mm which clears a data presence flag P in the register Rn within the register file 6 and sends a data send request to the corresponding memory location Mm in an external memory system 15. This action is indicated by the solid lines with arrows within FIG. 2. If data is present in the memory location Mm, its data presence flag P will be set so a reply packet 16 containing the requested data will be sent to the register Rn.

On the other hand, if data is not present in the memory location Mm, then the data waiting flag W of memory location Mm is set and the request to send data to register Rn is stored therein.

Therefore, when data is loaded into memory location Mm, the data is automatically provided to register Rn by means of a reply packet 16.

In the same manner, for the unit processing element shown in FIG. 1, if such a reply packet 16 is sent during the execution of the process belonging to the register Rn, a data load instruction is automatically inserted as shown by the symbol 17 in FIG. 2 by the packet handler 2 shown in FIG. 1.

Figure 3:
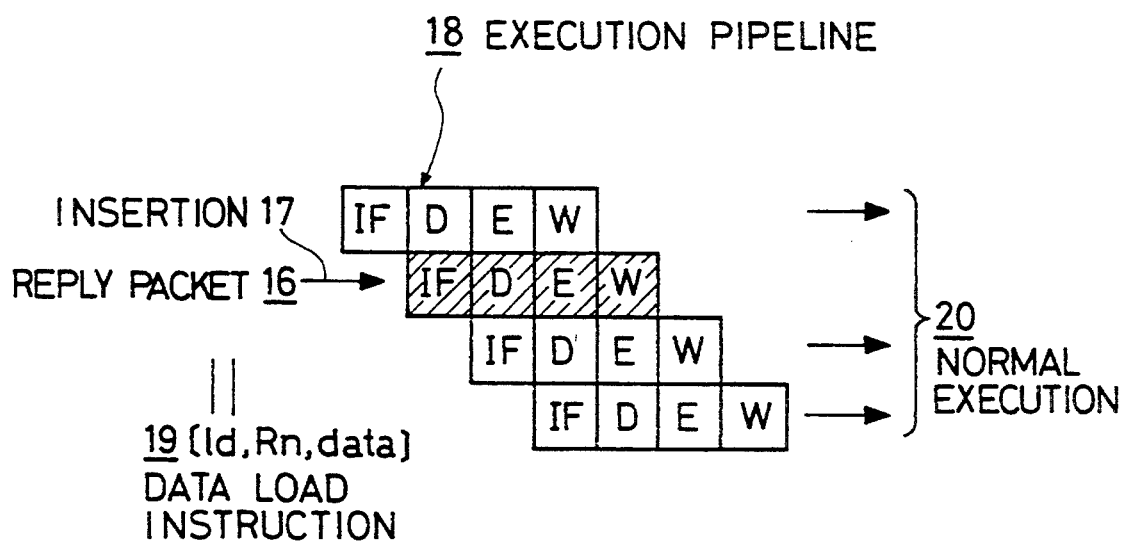
FIG. 3 is a diagram used to describe the automatic insertion of a instruction for loading data which has arrived into a register which is assigned to the current process and is awaiting data.

In short, as illustrated symbolically in FIG. 3, a data load instruction 19, namely the instruction ld Rn,data sent along with the reply packet 16 is inserted at an arbitrary point in time as shown by the arrow 17. Furthermore, this instruction 19 is treated exactly the same as a normal instruction.

When data is thereby loaded into register Rn, a data presence flag P corresponding to register Rn is set. Thereafter, when the instruction add Rn,Ra,Rb in the program 13 shown in FIG. 2 accesses register Rn within the register set 21 (RS$_K$) shown in FIG. 4, if as described above, data has not yet arrived in register Rn so that the data presence flag P of register Rn is not set (in the diagram, this flag is represented by the bit value "0"), the process suspension flag S is set (to a value of "1") and a process suspension flag S is also set in the corresponding register save area within the save area for register set 25 in local memory 22. At the same time, a new process fetched from the process ready queue 10 shown in FIG. 1 is executed.

Figure 4:
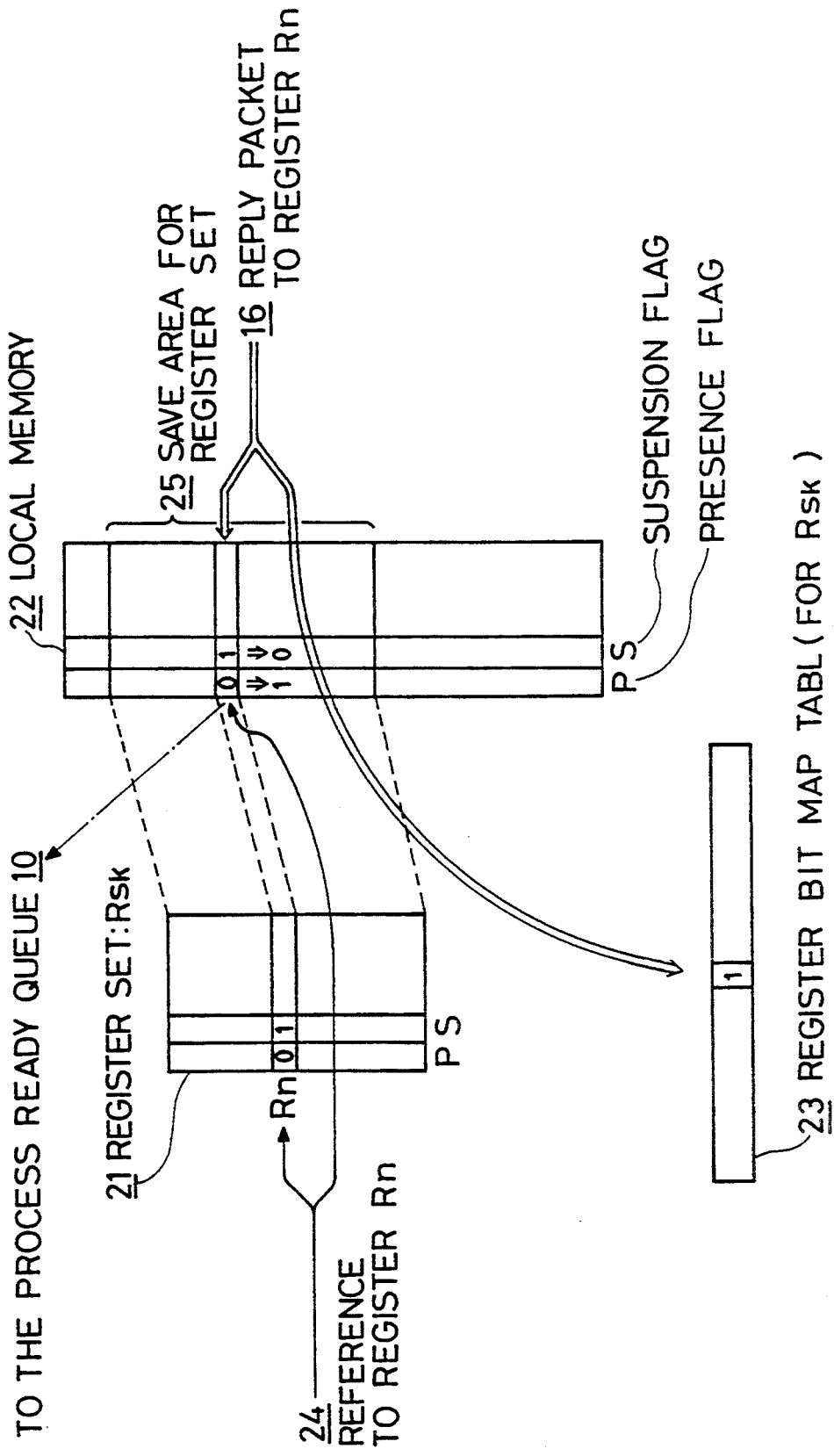
FIG. 4 is a diagram used to describe the arrival of data into a register which is assigned to the current process and is awaiting data.

When data arrives in a save area corresponding to a register belonging to a process other than the current process, the data is loaded into that save area. Specifically, as shown in FIG. 4, when a reply packet 16 is sent to the save area for register Rn as described heretofore, along with the loading of data to that save area, the flag values are changed as shown by arrows in FIG. 4, in that the data presence flag P is set (0→1) and the process suspension flag S is cleared (1→0), and the process belonging to this register is put into the process ready queue 10. In this preferred embodiment, a register bit map table 23 corresponding to each register set is also preferably prepared so that a bit in this table is set for each register for which data has been loaded into its save area. Thereby, data may be unsaved from the corresponding save area to the register belonging to the process as indicated in the register bit map table 23 before the execution of the process is resumed, or more specifically at least before the process is again executed as the current process.

In the above description of a preferred embodiment according to the present invention, the information used to resume execution of a process need not be loaded directly into the register or save area, but rather it may be stored in any separately specified area. In addition, the use of the register bit map table 23, while preferable, is not a limiting factor.

In addition, the group of registers assigned to a process need not necessarily all be saved to memory during process switching, but rather only the registers containing data need to be saved. For example, bits corresponding to the registers saved to memory may be set in the register bit map table, the use of which is preferable, thus assuring the restoration of the registers.

As described above, the present invention allows synchronizing data on registers to be achieved, a feat which had been difficult in the prior art. Therefore, this also means that a RISC system based on register operations may be built using general-purpose highly-parallel computers, and in fact, the ripple effect of this invention will make a major contribution to the development of these fields.

What is claimed is:

1. A method for inserting a data load instruction into an instruction sequence of a computer system, comprising the steps of:

detecting, by a packet handling means which is connected to an external source through a network, a packet having operand data, said packet being sent from the external source;

generating, by said packet handling means, in response to a detection of said packet by said detecting step, a data load instruction for loading said operand data of said packet;

fetching, by an instruction fetching unit for normally fetching instructions from a memory system of said computer system, said data load instruction, thereby inserting said data load instruction into said instruction sequence of said instructions from said memory system; and loading, by an instruction execution unit, said operand data from said packet into a register assigned to a current process of the computer system, in response to said data load instruction inserted into said instruction sequence;

wherein said external source is external to a computer containing said packet handling means, said instruction fetching unit, and said instruction execution unit.

2. A method for inserting a data load instruction into an instruction sequence of a computer system, comprising the steps of:

requesting operand data to be transmitted through a network from an external memory containing said operand data;

transmitting a packet containing said operand data from said external memory which is connected to said computer system through said network and contains said operand data, in response to said requesting step;

detecting, by a packet handling means which is connected to said external memory through said network, said transmitted packet having said operand data;

generating, by said packet handling means, in response to a detection of said packet by said step for detecting said packet, a data load instruction for loading said operand data of said packet into a register;

fetching, by an instruction fetching unit for normally fetching instructions from a memory system which is provided in said computer system, said data load instruction into said instruction sequence of said instructions from said memory system;

loading, by an instruction execution unit, said operand data from said packet, into said register in response to said data load instruction inserted into said instruction sequence;

detecting if said operand data for an instruction of said instruction sequence is contained in said register; and suspending execution of said instruction sequence if said operand data for said instruction sequence is detected not to be contained in said register;

wherein said external source is external to a computer containing said packet handling means, said instruction fetching unit, and said instruction execution unit.

3. A method according to claim 2, wherein the packet handling means detects the packet sent from said external memory containing said operand data, by performing the steps of:

detecting if said data packet contains operand data for said register; and loading said operand data within said data packet into a register save area in said memory system if the execution of said instruction was suspended and contents of said register were moved to said register save area so as to release said register for use with a process different from a current process.

4. A method according to claim 3, wherein said step of suspending execution unregisters said instruction sequence, thereby preventing said instruction sequence from being executed, said method further comprising the step of:

re-registering said suspended process as an executable process after said data is loaded into said register save area by said data load instruction.

* * * * *